US012515234B2

(12) United States Patent
Sangha

(10) Patent No.: US 12,515,234 B2
(45) Date of Patent: Jan. 6, 2026

(54) AUTOMATED CLEANING SOLUTION SPRAY DEVICE

(71) Applicant: Jagpreet Singh Sangha, Ontario (CA)

(72) Inventor: Jagpreet Singh Sangha, Ontario (CA)

( * ) Notice: Subject to any disclaimer, the term of this patent is extended or adjusted under 35 U.S.C. 154(b) by 502 days.

(21) Appl. No.: 17/940,524

(22) Filed: Sep. 8, 2022

(65) Prior Publication Data

US 2024/0082869 A1 Mar. 14, 2024

(51) Int. Cl.

| | |
|---|---|
| ***B05B 15/70*** | (2018.01) |
| ***A47K 3/28*** | (2006.01) |
| ***A47K 5/12*** | (2006.01) |
| ***B05B 1/16*** | (2006.01) |
| ***B05B 3/14*** | (2006.01) |
| ***B05B 9/04*** | (2006.01) |
| ***B05B 13/04*** | (2006.01) |

(52) U.S. Cl.

CPC .............. *B05B 15/70* (2018.02); *A47K 3/281* (2013.01); *A47K 5/12* (2013.01); *A47K 5/1217* (2013.01); *B05B 1/1663* (2013.01); *B05B 3/14* (2013.01); *B05B 13/0405* (2013.01); *B05B 13/0431* (2013.01); *A47K 5/1211* (2013.01); *A47K 2201/02* (2013.01); *B05B 9/0403* (2013.01)

(58) Field of Classification Search

CPC ....... B05B 1/16; B05B 1/1627; B05B 1/1663; B05B 3/14; B05B 9/0403; B05B 13/0405; B05B 13/0431; B05B 15/70; A47K 3/281; A47K 5/12; A47K 5/1211; A47K 5/1217; A47K 2201/02

See application file for complete search history.

(56) References Cited

U.S. PATENT DOCUMENTS

| | | | | | |
|---|---|---|---|---|---|
| 2,316,307 | A * | 4/1943 | Young | A47K 5/12 | 222/2 |
| 4,104,744 | A * | 8/1978 | Odencrantz | A45F 3/00 | 4/616 |
| 6,463,600 | B1 * | 10/2002 | Conway | A47K 3/001 | 4/662 |
| 2008/0272206 | A1 * | 11/2008 | Barrett | A47K 5/12 | 239/282 |

FOREIGN PATENT DOCUMENTS

| | | | | |
|---|---|---|---|---|
| CN | 109046814 | A * | 12/2018 | B05B 1/18 |
| CN | 112007795 | A * | 12/2020 | B05B 12/16 |

* cited by examiner

*Primary Examiner* — Darren W Gorman

(57) ABSTRACT

The present disclosure provides an automated dispenser and spray device configured to apply a cleaning solution to a user's body in an automated fashion as they take a shower, freeing their hands. The device comprises an oscillating arm assembly of adjustable height with a spray nozzle at the end. Various parameters of the spray can be adjusted to a user's preferences via a control module and interface so that they can simply focus on cleaning themselves as the solution is applied.

17 Claims, 3 Drawing Sheets

AUTOMATED CLEANING SOLUTION SPRAY DEVICE

FIELD OF INVENTION

The present invention relates generally to the technical field of cleaning solution dispensing devices. More specifically, the present invention relates to an automated dispenser of cleaning solution for mounting to a wall such as a shower wall.

BACKGROUND

Applying soap while in the shower is more strenuous than most people care to admit, and for those with physical impairments it can actually be daunting or even impossible to reach certain areas of the body. One must first reach an area with the soap in hand and then scrub and lather the area after applying it, all while in a small, confined space where it is easy to slip. The difficulty of this often results in reduced frequency of cleaning, which can result in negative health and social issues. It also results in longer showers which uses more water and has negative impacts on the environment.

Other problems with the regular application of soaps such as bar soap include issues with using the last piece of a bar that has become too small to apply effectively, and the accidental contamination of soaps that have been put down or dropped in dirty areas.

There is a need for a device which is capable of applying soap from a clean, uncontaminated reservoir to a user's body in an automated fashion, and doing so in such a way that hard to reach areas are covered.

It is within this context that the present invention is provided.

SUMMARY

The present disclosure provides an automated dispenser and spray device configured to apply a cleaning solution to a user's body in an automated fashion as they take a shower, freeing their hands. The device comprises an oscillating arm assembly of adjustable height with a spray nozzle at the end. Various parameters of the spray can be adjusted to a user's preferences via a control module and interface so that they can simply focus on cleaning themselves as the solution is applied.

Thus, according to one aspect of the present disclosure there is provided a device for automatically applying a cleaning solution to a body of a user, the device comprising: a waterproof housing configured to be mounted to a wall; a gear and crankshaft assembly disposed within the housing, oriented with the axis of rotation of the crankshaft and gear being horizontal; a first motor coupled to and configured to rotate the crankshaft; a cleaning fluid reservoir comprising an electric pump connected to an outlet; a nozzle having an adjustable spray width.

The device further comprises an oscillating arm assembly coupled to the gear of the gear and crankshaft assembly, the oscillating arm assembly comprising a hollow channel with a first proximal end coupled to the outlet of the cleaning fluid reservoir and a second distal end coupled to the nozzle; and a control module and interface with a power source coupled to the first motor and to the cleaning reservoir pump, wherein operation of a start control of the control module and interface causes the pump to eject cleaning fluid through the hollow channel of the oscillating arm assembly and the first motor to turn the crankshaft and gear, causing oscillation of the arm assembly and nozzle as cleaning solution is ejected from the nozzle to apply it to the body of a user facing the device.

In some embodiments, the oscillating arm assembly comprises a rod with a top end having a toothed portion disposed within the housing, the toothed portion being coupled to the gear of the gear and crankshaft assembly, the rod being constrained by the housing to vertical movement, a bottom end of the rod that protrudes from the housing being coupled to the nozzle by one or more hinged joints.

The bottom end of the rod may for example be coupled to the nozzle by two hinged joints (118, 146) which are arranged and constrained to mirror the movement of each other, converting vertical oscillations of the rod's main body into oscillating movement of the nozzle.

Alternatively, the bottom end of the rod may be coupled to the nozzle by two hinged joints, with a first joint of the hinged joints proximal to the nozzle being constrained to a given height by a vertical support, converting vertical oscillations of the rod's main body into oscillating movement of the nozzle.

In some embodiments, the control module and interface comprises one or more controls for setting a range of motion of the oscillating nozzle, and comprises a processor (140) configured to control the first motor in accordance with the chosen settings to adjust the height of the oscillating arm assembly and the range of oscillation.

In some embodiments, the control module and interface is coupled to a timer (142), and is configured to operate the first motor and pump after a predetermined period has elapsed following operation of the control module and interface.

In such examples, the control module and interface may comprises a speaker (144) and be configured to cause the speaker to emit one or more sounds counting down the predetermined period.

In some embodiments, the control module and interface comprises an LED light indicator configured to indicate whether the device is powered on.

In some embodiments, the device comprises a second motor (148) configured to control the movement of one or more hinged joints of the oscillating arm assembly.

In some embodiments, the spray nozzle comprises a row of horizontally arranged nozzle outlets.

In such examples, the spray nozzle may further comprise an adjustable shutter assembly disposed on horizontal guide tracks and configured to cover an adjustable number of the nozzle outlets to vary the width of the spray according to a user's preference.

Furthermore, the shutter assembly may be controllable by a lever coupled to the shutters.

The spray nozzle may comprise two shutters and a mechanism for causing a first shutter to mirror the horizontal movement of a second shutter.

The control module and interface may also comprise one or more knobs for adjusting the width of the spray nozzle.

In some embodiments, the pump is a sump pump configured to keep the spray nozzle primed at all times.

In some embodiments, the device comprises a second reservoir of cleaning solution with a pump coupled to the oscillating arm channel, thus keeping the spray nozzle primed and avoiding cavitation of the cleaning solution.

In some embodiments, one or more of the electrical components of the device are coated in a layer of epoxy resin or polyurethane resin to improve waterproofing and moisture permeability.

In some embodiments, one or more of the electrical components of the device are hermetically sealed in a plastic casing to improve waterproofing and moisture permeability.

In some embodiments, the device is configured to perform a complete cycle of oscillation and spraying of cleaning solution in response to operation of the one or more controls, such that the oscillating arm assembly and spray nozzle return to a starting position at the end of each cycle.

BRIEF DESCRIPTION OF THE DRAWINGS

Various embodiments of the invention are disclosed in the following detailed description and accompanying drawings.

Figure 1:
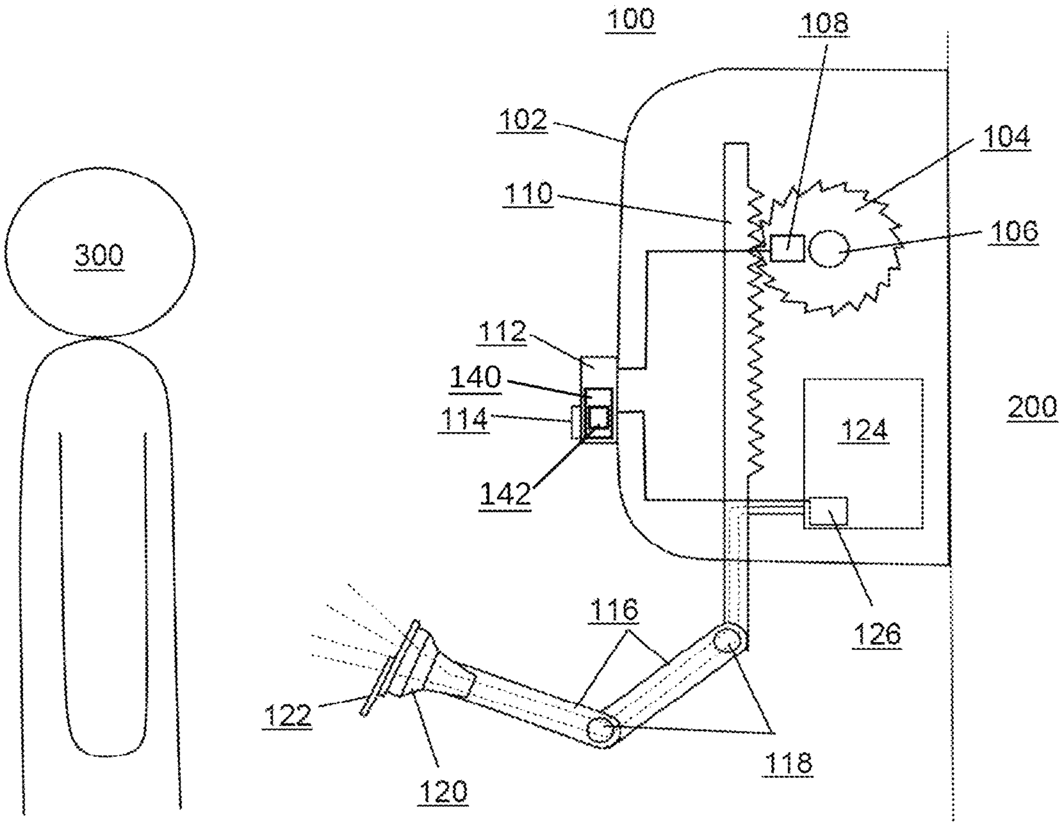
FIG. 1 illustrates cross-sectional components view of an example configuration of a cleaning solution spray device according to the present disclosure.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present disclosure provides a device for distributing cleaning solution such as soap gel or foam across a user's body while they shower in an automated fashion.

Referring to FIG. 1, a cross-sectional components view of an example configuration of a cleaning solution spray device 100 is shown applying the cleaning solution to a user 300 while mounted to a wall 200.

As can be seen, the device comprises a waterproof housing 102 in which a gear 104 and crankshaft 106 assembly are installed. The crankshaft is coupled to a motor 108 such as a stepper motor which turns the crankshaft 106 and thus the gear 104 about a horizontal axis. The gear 104 is then coupled to a toothed portion of a vertical rod 110 that is constrained to move only up or down, pushed by the rotation of the gear 104.

The movement of the motor 108 is controlled by a control module 112 that comprises an electric power source such as a set of rechargeable lithium ion batteries, the control module has a control interface 114 with one or more knobs, buttons, dials, and switches used to operate the device 100.

The bottom end of the vertical rod 110 is coupled by a pair of pivot points or hinged joints 118 to an oscillating arm 116 that has a spray nozzle 120 with an adjustable shutter assembly 122 on the end. The oscillating arm 116 is hollow with a flow path leading from the spray nozzle 120 to an outlet of a reservoir 124 that holds the cleaning solution. The outlet has a valve and electric pump 126 that are also coupled to and controlled by the control module 112.

As shown, a user 300 stands in front of the device 100 and operates the control interface 114 to start the dispensing. The control module may have a timer, and may also have various LED indicators or/and a speaker for showing that the device is on and counting down to the dispensing of cleaning fluid.

In the present example, the device counts down for 3 seconds then operates the pump 126 to flow cleaning solution out of the reservoir 124 for 5 seconds. Simultaneously, the device operates motor 108 to cause the vertical rod 110 to move up and down, causing oscillation of the nozzle up and down within a desired range, usually from the neck of the user to the ankle but this can vary as desired and can be changed by the control module interface 114—for example there may be a pair of knobs allowing a user to adjust the initial height of the spray head and the range through which it moves during oscillation. A full cycle should generally cause the oscillating arm assembly to end up where it started in its original position ready for another cycle.

The user 300 thus simply needs to stand with the side of their body they wish to apply soap to facing the device 100 and can focus on scrubbing their body since their hands are free and not required for the application of soap. This is less strenuous on the user and saves time and effort. The reservoir 124 is also sealed so the cleaning solution is guaranteed to be clean.

Figure 2:
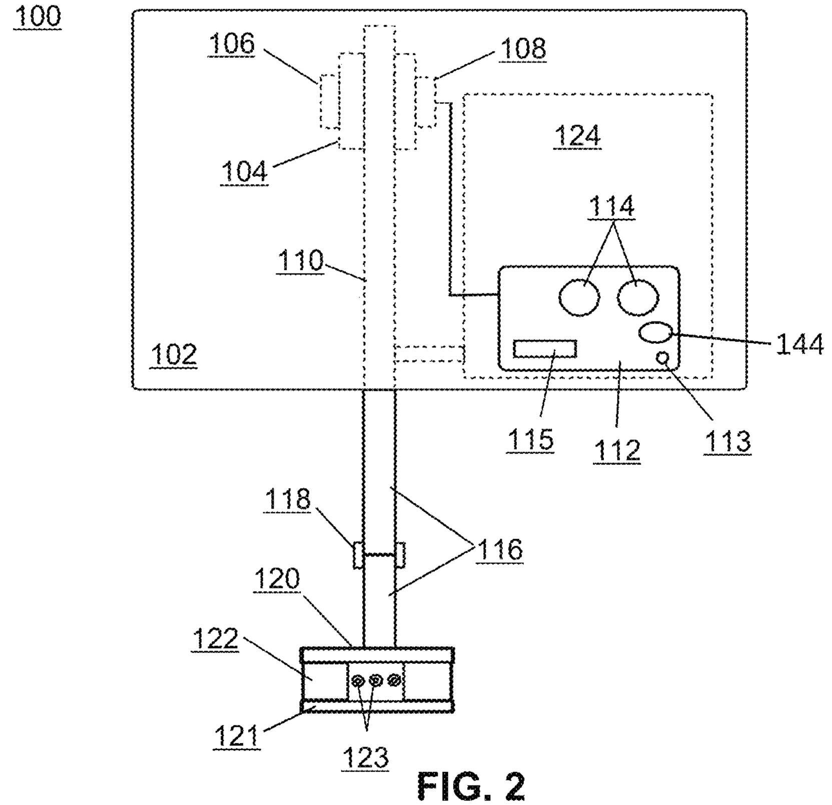
FIG. 2 illustrates a frontal view of the example configuration.

Referring to FIG. 2, a frontal view of the example configuration is shown. Here the knobs/dials of the control interface 114 can be seen alongside a power on/off button 115 and an LED indicator 113.

An example configuration of a spray nozzle 120 head is also shown. The spray nozzle head comprises a pair of adjustable shutters 122 mounted on guide tracks 121 so that they can cover a variable number of nozzles 123 which are arranged in a horizontal line. This allows the width of the spray to be adjusted in addition to the height range of the oscillation.

Figure 3A:
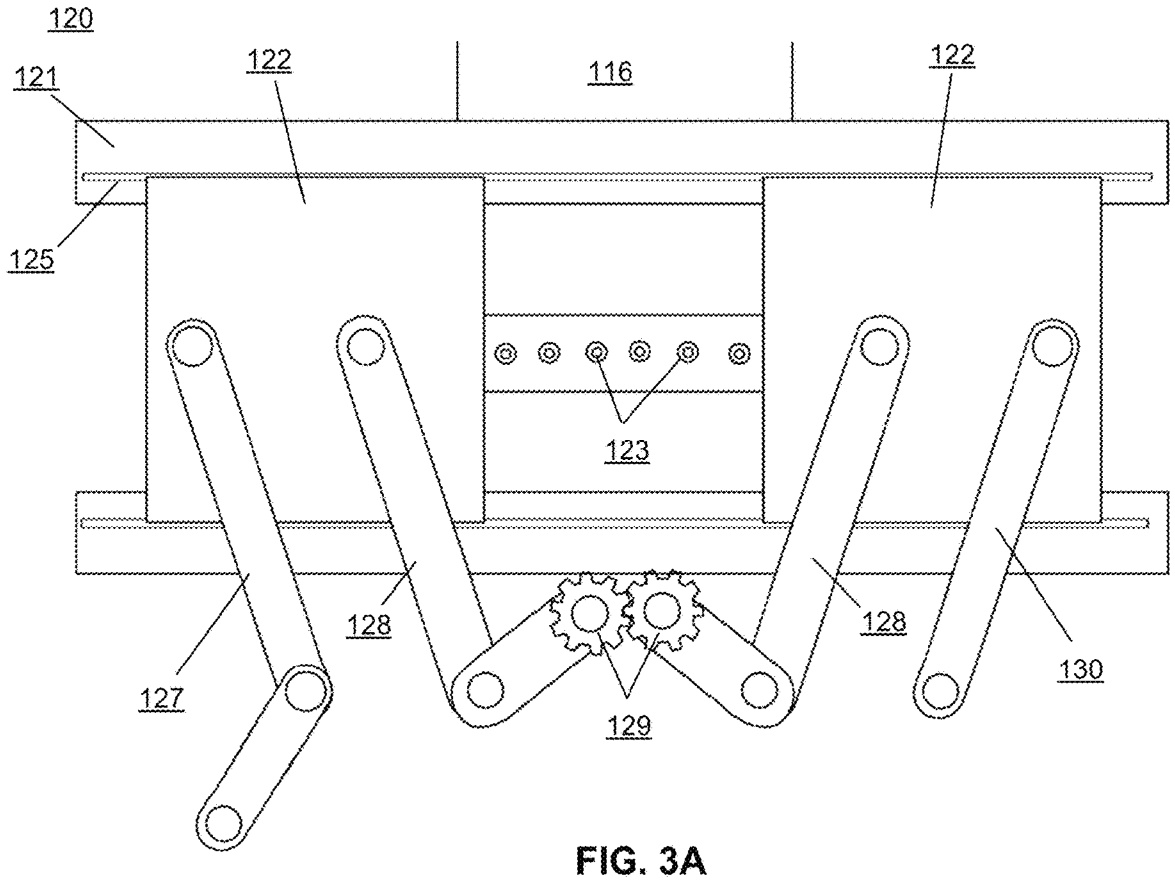
FIG. 3A illustrates a first close up view of an example configuration of a spray nozzle of the device with an adjustable shutter assembly according to the present disclosure.
Figure 3B:
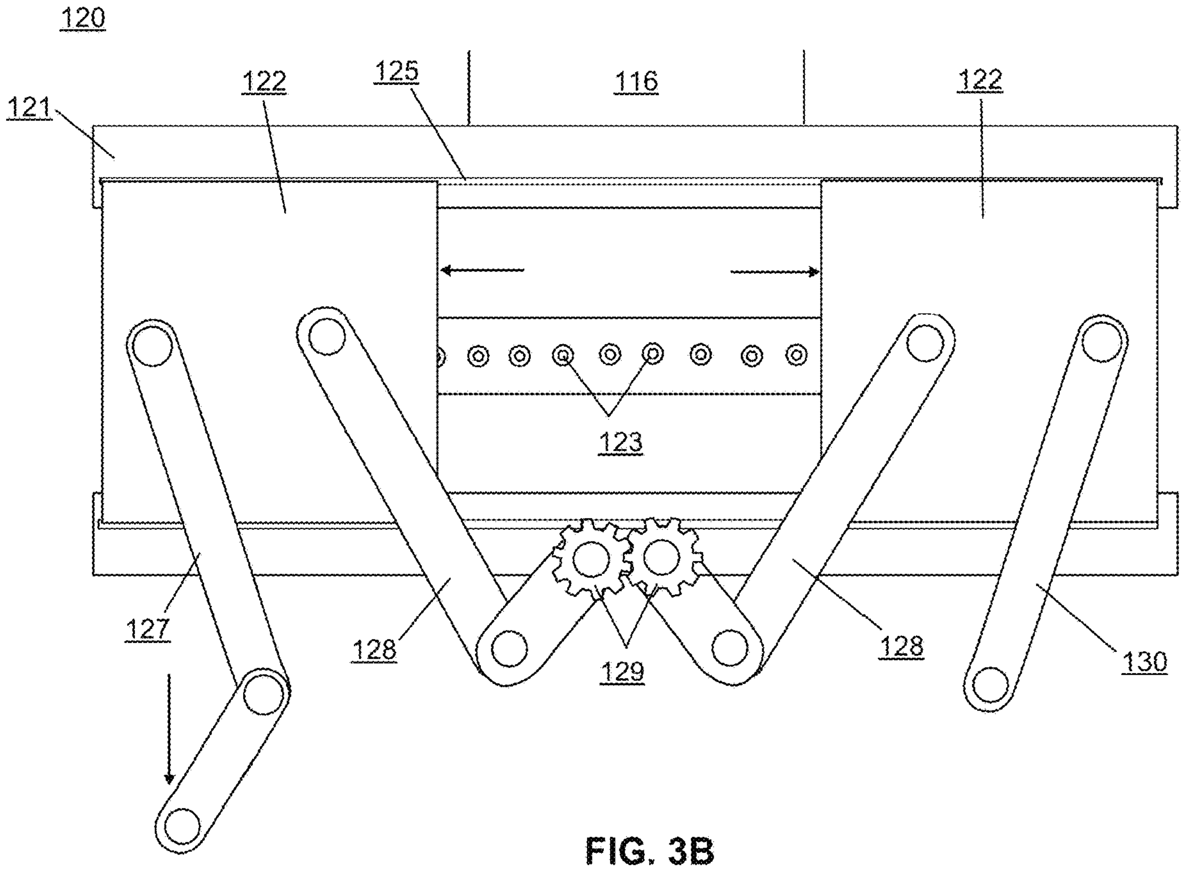
FIG. 3B illustrates a second close up view of the spray nozzle with the adjustable shutters moving outwards to reveal additional nozzle outlets.

FIG. 3A and FIG. 3B illustrate first and second close up views of the spray nozzle head 120 with the adjustable shutters 122 starting in a neutral position in FIG. 3A and then moving outwards to reveal additional nozzle outlets 123 in FIG. 3B.

The movement of the shutters 122 is constrained by a set of tracks 125 cut into guide rails 121 at the top and bottom of the spray nozzle head 120. These slidable shutters 122 can be pulled apart or together by lever 127 and arm 130. Lever 127 has a pivot joint in the middle, so that an upwards motion causes the shutters 122 to slide towards the centre.

The movement of the two shutters 122 is coupled, causing them to mirror each other, by a pair of arms 128 that are connected by a gear assembly 129. This constraints the opposing gear to turn in the opposite direction to the first gear, and thus also constrains the attached arm and shutter to move in the opposite direction, meaning they move inwards and outwards in sync with each other.

As can be seen in FIG. 3B, the outward movement of the shutters 122 from the centre causes more spray nozzles 123 to be revealed, increasing the width of the dispensing spray.

Figure 4A:
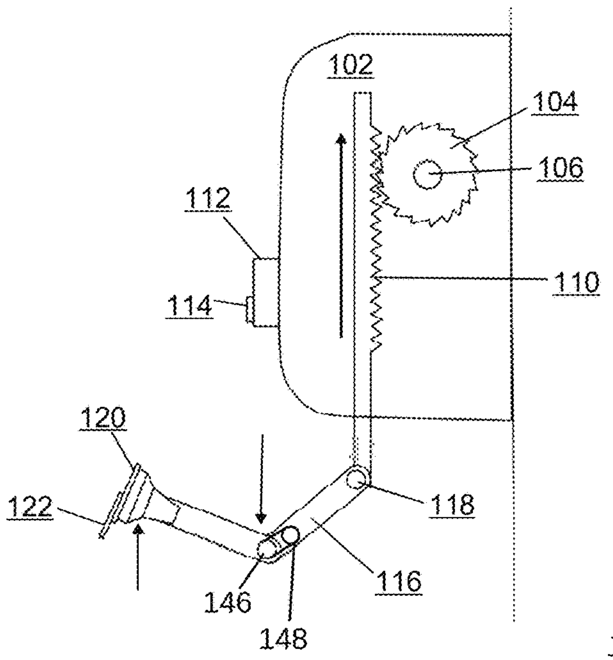
FIG. 4A illustrates a first side view of the example configuration of the device according to the present disclosure with the oscillating arm assembly in a first position.
Figure 4B:
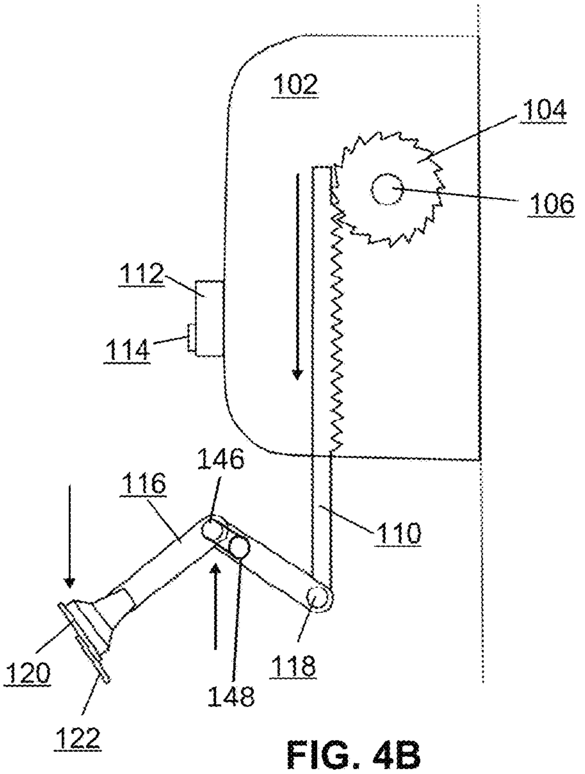
FIG. 4B illustrates a second side view of the example configuration with the oscillating arm assembly in a second position.

FIG. 4A and FIG. 4B show the motions of the oscillating arm assembly 116 as the vertical rod 110 is moved up and down by the gear 104 rotation. As can be seen, the hinged joints 118 are constrained such that upward movement of one causes a mirrored downward movement of the other, oscillating the nozzle spray head up and down in tandem.

Figure 4C:
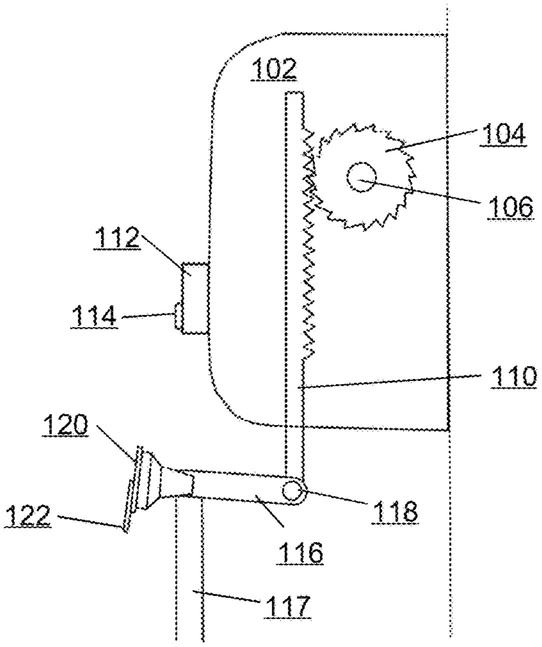
FIG. 4C illustrates an alternative example configuration of the device with a differently configured oscillating arm assembly.

As can be seen from FIG. 4C a similar effect can be achieved by having one fewer joint in the oscillating arm assembly 116 and having the joint between the oscillating arm 116 and the spray nozzle head 120 supported by a vertical support 117.

It should be noted that these are merely examples of how an oscillating arm assembly could be constructed, and that various other oscillating mechanisms known in the art could be applied in the context of the disclosed device 100.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the device have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A device for automatically applying a cleaning solution to a body of a user, the device comprising:

a waterproof housing configured to be mounted to a wall;

a gear and crankshaft assembly disposed within the housing, oriented with the axis of rotation of the crankshaft and gear being horizontal;

a first motor coupled to and configured to rotate the crankshaft;

a cleaning solution reservoir comprising an electric pump and a reservoir outlet;

a spray nozzle having an adjustable spray width;

an oscillating arm assembly coupled to the gear of the gear and crankshaft assembly, the oscillating arm assembly comprising a hollow channel with a first proximal end coupled to the reservoir outlet and a second distal end coupled to the spray nozzle;

a control module and interface comprising a power source, wherein the control module and interface is coupled to the first motor and to the electric pump of the cleaning solution reservoir, wherein operation of a start control of the control module and interface causes the electric pump to eject cleaning solution through the hollow channel of the oscillating arm assembly and causes the first motor to turn the crankshaft and gear, thereby causing oscillation of the oscillating arm assembly and spray nozzle as the cleaning solution is ejected from the spray nozzle to apply the cleaning solution to the body of a user facing the device.

2. A device according to claim 1, wherein the oscillating arm assembly comprises a rod with a top end having a toothed portion disposed within the housing, the toothed portion being coupled to the gear of the gear and crankshaft assembly, the rod being constrained by the housing to vertical movement, a bottom end of the rod that protrudes from the housing being coupled to the spray nozzle by one or more hinged joints.

3. A device according to claim 2, wherein the rod comprises a main body portion, and wherein the bottom end of the rod is coupled to the spray nozzle by two hinged joints which are arranged and constrained to mirror the movement of each other, converting vertical oscillations of the main body portion into oscillating movement of the spray nozzle.

4. A device according to claim 1, wherein the control module and interface comprises one or more controls for setting a range of motion of the oscillating spray nozzle, and comprises a processor (140) configured to control the first motor in accordance with the chosen settings to adjust the height of the oscillating arm assembly and the range of oscillation.

5. A device according to claim 1, wherein the control module and interface is coupled to a timer (142), and is configured to operate the first motor and pump after a predetermined period has elapsed following operation of the control module and interface.

6. A device according to claim 5, wherein the control module and interface comprises a speaker (144) and is configured to cause the speaker to emit one or more sounds counting down the predetermined period.

7. A device according to claim 1, wherein the control module and interface comprises an LED light indicator configured to indicate whether the device is powered on.

8. A device according to claim 1, wherein the device comprises a second motor (148) configured to control the movement of one or more hinged joints of the oscillating arm assembly.

9. A device according to claim 1, wherein the spray nozzle comprises a row of horizontally arranged nozzle outlets.

10. A device according to claim 9, wherein the spray nozzle comprises an adjustable shutter assembly disposed on horizontal guide tracks and configured to cover an adjustable number of the nozzle outlets to vary the width of the spray according to a user's preference.

11. A device according to claim 10, wherein the adjustable shutter assembly is controllable by a lever coupled to the adjustable shutter assembly.

12. A device according to claim 10, wherein the adjustable shutter assembly comprises a first shutter and a second shutter, and a gear mechanism coupling the first and second shutters, the gear mechanism configured to cause the first shutter to mirror horizontal movement of the second shutter.

13. A device according to claim 10, wherein the control module and interface comprises one or more knobs for adjusting the width of the spray nozzle.

14. A device according to claim 1, wherein the pump is a sump pump configured to keep the spray nozzle primed at all times.

15. A device according to claim 1, wherein the first motor, the electric pump, and the control module and interface are coated in a layer of epoxy resin or polyurethane resin to improve waterproofing and moisture permeability.

16. A device according to claim 1, wherein the first motor, the electric pump, and the control module and interface are hermetically sealed in a plastic casing to improve waterproofing and moisture permeability.

17. A device according to claim 1, wherein the device is configured to perform a complete cycle of oscillation and spraying of cleaning solution in response to operation of the start control of the control module and interface, such that the oscillating arm assembly and spray nozzle return to a starting position at the end of each cycle.

* * * * *